(12) United States Patent
Van Parys

(10) Patent No.: US 7,564,832 B2
(45) Date of Patent: Jul. 21, 2009

(54) SCHEDULING POLL PACKETS IN BLUETOOTH SNIFF MODE

(75) Inventor: Jorgen Van Parys, Grimbergen (BE)

(73) Assignee: STMicroelectronics N.V., Amsterdam (NL)

( * ) Notice: Subject to any disclaimer, the term of this patent is extended or adjusted under 35 U.S.C. 154(b) by 361 days.

(21) Appl. No.: 10/996,121

(22) Filed: Nov. 23, 2004

(65) Prior Publication Data

US 2005/0122990 A1 Jun. 9, 2005

(30) Foreign Application Priority Data

Nov. 26, 2003 (EP) .................................. 03078716

(51) Int. Cl.
*H04J 3/06* (2006.01)
(52) U.S. Cl. ....................... 370/350; 370/346
(58) Field of Classification Search ............... None
See application file for complete search history.

(56) References Cited

U.S. PATENT DOCUMENTS

| | | | |
|---|---|---|---|
| 6,570,857 | B1 | 5/2003 | Haartsen et al. |
| 2002/0028657 | A1 | 3/2002 | Davies |
| 2002/0116460 | A1* | 8/2002 | Treister et al. .............. 709/204 |
| 2002/0193073 | A1* | 12/2002 | Fujioka ....................... 455/41 |
| 2003/0139191 | A1* | 7/2003 | Koo ........................... 455/461 |
| 2004/0142690 | A1* | 7/2004 | Eom et al. ................... 455/436 |

FOREIGN PATENT DOCUMENTS

WO WO 03/061215 A1 7/2003

OTHER PUBLICATIONS

European Search Report from European Patent Application 03078716.2, filed Nov. 26, 2003.
European Search Report from European Patent Application 03078715.4, filed Nov. 26, 2003.

* cited by examiner

*Primary Examiner*—Erika A Gary
(74) *Attorney, Agent, or Firm*—Lisa K. Jorgenson; William R. McClellan; Wolf, Greenfield & Sacks, P.C.

(57) ABSTRACT

A Bluetooth master radio frequency unit addresses a slave radio frequency unit, to enable the slave to resynchronize to the master, by sending poll packets or null packets, the master being arranged to send sufficient null packets to enable the slave to resynchronize, before sending a poll packet, to determine whether the slave has resynchronized. This approach can provide the slave with the same number of synchronization packets as in the simpler algorithms, while allowing the slave to preserve more (transmit) power and still allowing the master to detect whether the slave has resynchronized or not (and thus to update a Link Supervision Timer for example). Notably this is also suitable for use in prescheduling implementations.

16 Claims, 2 Drawing Sheets

SCHEDULING POLL PACKETS IN BLUETOOTH SNIFF MODE

BACKGROUND OF THE INVENTION

1. Field of the Invention

This invention relates to methods of scheduling of polling packets for a telecommunications device using a telecommunications protocol, especially a wireless protocol, such as POLL packets of Bluetooth devices, to apparatus and software for carrying out such methods, and in particular to scheduling polling packets when a telecommunications device such as a Bluetooth device is master of a radio link in Sniff mode.

2. Description of the Related Art

Bluetooth is a well known short-range radio link intended to replace the cable(s) connecting portable and/or fixed electronic devices. Full details are available from Bluetooth SIG which has its global headquarters in Overland Park, Kans., USA. Key features are robustness, low complexity, low power, and low cost. Bluetooth operates in the unlicensed ISM band at 2.4 GHz. A frequency hop transceiver is applied to combat interference and fading. A slotted channel is applied with a nominal slot length of 625 μs. On the channel, information is exchanged through packets. In Bluetooth version 1.1 each packet is transmitted on a different hop frequency. In Bluetooth version 1.2 it is proposed that transmission and receive packets may be sent on the same frequency. The Bluetooth protocol uses a combination of circuit and packet switching. Slots can be reserved for synchronous packets.

The Bluetooth system can provide a point-to-point connection (only two Bluetooth units involved), or a point-to-multipoint connection. In the point-to-multipoint connection, the channel is shared among several Bluetooth units. Two or more units sharing the same channel form a piconet. One Bluetooth unit acts as the master of the piconet, whereas the other unit(s) acts as slave(s). Up to seven slaves can be active in the piconet. In addition, many more slaves can remain locked to the master in a so-called parked state. These parked slaves cannot be active on the channel, but remain synchronized to the master. Both for active and parked slaves, the channel access is controlled by the master. Units can also be in a hold mode or a sniff mode.

Similar to the hold mode, a slave in park or sniff mode periodically wakes up to listen to transmissions from the master and to re-synchronize its clock offset. In the sniff mode, the duty cycle of the slave's listening activity can be reduced. If a slave participates on a link, it has to listen in every slot to the master traffic. With the sniff mode, the time slots where the master can start transmission to a specific slave is reduced; that is, the master can only start transmission in specified time slots. These so-called sniff slots are spaced regularly with an interval of $T_{sniff}$. Thus, the sniff mode may be described as the provision of periodic moments in time when communication from the master can occur, these times being at longer intervals than available during normal operation. The slave starts listening at the sniff slots for $N_{sniff}$ attempt consecutive receive slots unless a packet with matching address is received. After every reception of a packet with matching address, the slave continues listening at the subsequent $N_{sniff}$ timeout or remaining of the receive slots, whichever is greater. So, for $N_{sniff}$ timeout >0, the slave continues listening as long as it receives packets with matching address. To enter the sniff mode, the master or slave can issue a sniff command message. This message will contain the sniff interval $T_{sniff}$ and an offset $D_{sniff}$. The timing of the sniff mode is then determined. It is known to vary the parameters $T_{sniff}$ and $N_{sniff}$ according to backlogs of data to be transmitted between each of a number of different slaves, to save overall power consumption of the slaves. In Bluetooth version 1.2 the $N_{sniff}$ timeout is used after the slave has transmitted a data packet. The $N_{sniff}$ timeout is not used when only POLL/NULL packets have been exchanged.

NULL packets can be sent by a master and used by the slave to maintain synchronization. The POLL packet is very similar to the NULL packet. It does not have a payload either. In contrast to the NULL packet, it requires a confirmation from the recipient. Upon reception of a POLL packet the slave must respond with a packet. This return packet is an implicit acknowledgement of the POLL packet. The Poll packet can be used by the master in a piconet to poll the slaves, which must then respond even if they do not have information to send.

Synchronization is important for ad-hoc connections. In the Bluetooth system, each unit has a free-running native clock which has an accuracy of 20 ppm when the unit is active and 250 ppm when the unit is in a low-power mode. When a unit wants to page another unit, it can speed up the connection establishment when it knows the recipient's native clock. This clock information should be stored during a previous connection stage. A Bluetooth unit can thus have a list of unit addresses with corresponding native clocks it can use when paging one of those units. The clock information is stored as a time offset to its own native clock. When a piconet is in operation, it is the native clock in the master that determines the timing. The slaves add an offset to their native clocks in order to be hop synchronized to the master. The slave's native clock plus the offset with respect to the master provide the proper input to the hop selection scheme. Since the native clocks of the master and the slave are free-running, the offset in the slaves has to be adjusted continuously to compensate for drift. The reception of packets sent by the master is used to adjust the offset. The access code in front of the packet has the proper autocorrelation properties to enable a slave to derive the timing.

A master needs to send a poll packet occasionally, to maintain its awareness of other slaves within range, and to maintain synchronization of such slaves. The number of poll packets sent should be kept to a minimum to avoid the power cost of causing these slaves to have to transmit. Transmitting usually costs more power than receiving and so contributes to draining the batteries of units which are presumably trying to save power by being in the sniff mode. Where resources are scarce and must be used in an efficient way the ratio of the number of POLL and NULL packets to the number of data packets should be minimized. Besides this efficiency goal, a polling master in Bluetooth should also be fair. In the Bluetooth best effort case, fairness implies that slaves get the same fraction of their fair share of communication time where the fair share is determined by rules.

For scheduling POLL packets during Sniff mode, several scheduling algorithms are known and are in use in commercially available devices. The more advanced algorithms stop scheduling POLL packets (and start scheduling NULL packets) in the sniff attempts when the slave has synchronized (i.e. when the slave did respond with a NULL packet). In other words when the slave has synchronized, it is sufficient to send NULL packets for the remaining master Tx slots of the sniff attempts. This algorithm is not suitable for implementations that are using a "prescheduling algorithm". In "prescheduling implementations", Tx/Rx packet pairs are allocated in advance. For a master (using a prescheduling algorithm) of a Bluetooth link in sniff mode, this means that the master does not know in advance (i.e. at the time the actual scheduling occurs) when the slave will be synchronized. One possible solution to this problem is to send POLL packets in every Tx slot of the Sniff attempts, but this costs transmit power at the slave side (since the slave is obliged to respond to POLL packets).

SUMMARY OF THE INVENTION

According to a first aspect, the invention provides a master wireless, e.g. radio frequency, unit arranged to communicate with a slave wireless, e.g. radio frequency, unit by sending packets, the master having a controller arranged to address the slave to enable the slave to resynchronize to the master, the master sending packets which need no response sufficiently often e.g. with a sufficient frequency or at a first rate, or to send a sufficient number of packets, e.g. a first number, to enable the slave to resynchronize, followed by a packet which prompts a response, to determine whether the slave has resynchronized. The packets may be sent using a frequency hop scheme. The addressing of the slave device includes addressing each slave device individually rather than broadcasting to all slave devices. A plurality of slave devices may be in communication with a master device. In this case, each slave device is addressed individually using packets which need no response, the packets therefore being associated with the relevant slave device address. The present invention is particularly useful when a connection between a slave device and a master device is lost if the synchronization between slave and master is not completed successfully. Further, the master and one or more slave devices can exchange data during the time in which packets which need no response and packets which need a response are sent by the master device. This allows a quality of service to be maintained even though packets which need no response are being sent for synchronization purposes.

This can help minimize the power used by the slave, while enabling the slave to resynchronize, and keeping transmissions as few as possible, to leave as much bandwidth as possible available for serving other slaves, and to minimize interference to other masters. This approach can provide the slave with the same number of synchronization packets as in the simpler algorithms, while allowing the slave to preserve more (transmit) power and still allowing the master to detect whether the slave has resynchronized or not (and thus to update a Link Supervision Timer for example). Notably this is also suitable for use in prescheduling implementations.

The above method is preferably used when only discontinuous transmission, is allowed, i.e. at periodic intervals these intervals being longer than during normal operation. For example, the wireless units can use the Bluetooth standard, the slave can be in a sniff mode, the master can use a prescheduling of slots for transmit and receive packet pairs, allocated in advance, or the master can have a link supervision timer which it updates according to the response. The packets needing no response can be Bluetooth NULL packets. The packets for prompting a response can be Bluetooth POLL packets for example.

This provides the advantages that a) it can be determined whether a slave device is still present and synchronized, b) initiate data transmission immediately if necessary, and c) allow power saving on the slave side. In accordance with known techniques the slave device is not able to save power during prescheduling since it is not known in advance when the slave synchronizes. Thus, known techniques force a slave response via only POLL packets.

In one aspect of the present invention a type of packet such as a POLL packets, which require a response from the slave are replaced with packets which require no response such as NULL packets when the slave is in a periodic communication mode such as the sniff mode. By sending NULL packets in most of the Sniff attempt Tx slots until it is almost certain that the slave has resynchronized, a more optimal solution for scheduling POLL packets is obtained which allows the slave to save some power (and reduces interference on other piconets), even if the master uses a prescheduling algorithm. The present invention also includes setting a ratio of packets requiring a response to packets requiring no response during an operation mode in which only periodic communication from the master to the slave is allowed. As sending a series of packets which do not require a response does not provide clarity as to whether the slave is synchronized, the synchronization is only known after the response to a packet which requires a response. Depending on operation conditions or load, the master may wish to vary the time of uncertainty, i.e. to vary it by setting a different number of packets not requiring a response which are sent before a packet which requires a response is sent.

Another aspect of the invention provides consumer equipment having the master wireless unit. Another aspect provides software for implementing the controller of the master wireless unit. Another aspect provides a method of polling from a master wireless unit. Another aspect provides a sequence of wireless signals used to poll from a master wireless unit.

Any of the additional features may be combined with each other or with any of the aspects of the invention. Other advantages of the invention may be apparent to those skilled in the art. How the present invention may be put into effect will now be described with reference to the appended schematic drawings. Obviously, numerous variations and modifications can be made without departing from the claims of the present invention. Therefore, it should be clearly understood that the form of the present invention is illustrative only and is not intended to limit the scope of the present invention.

The features of the invention will be better understood by reference to the accompanying schematic drawings, which illustrate preferred embodiments of the invention.

DETAILED DESCRIPTION

Figure 1:
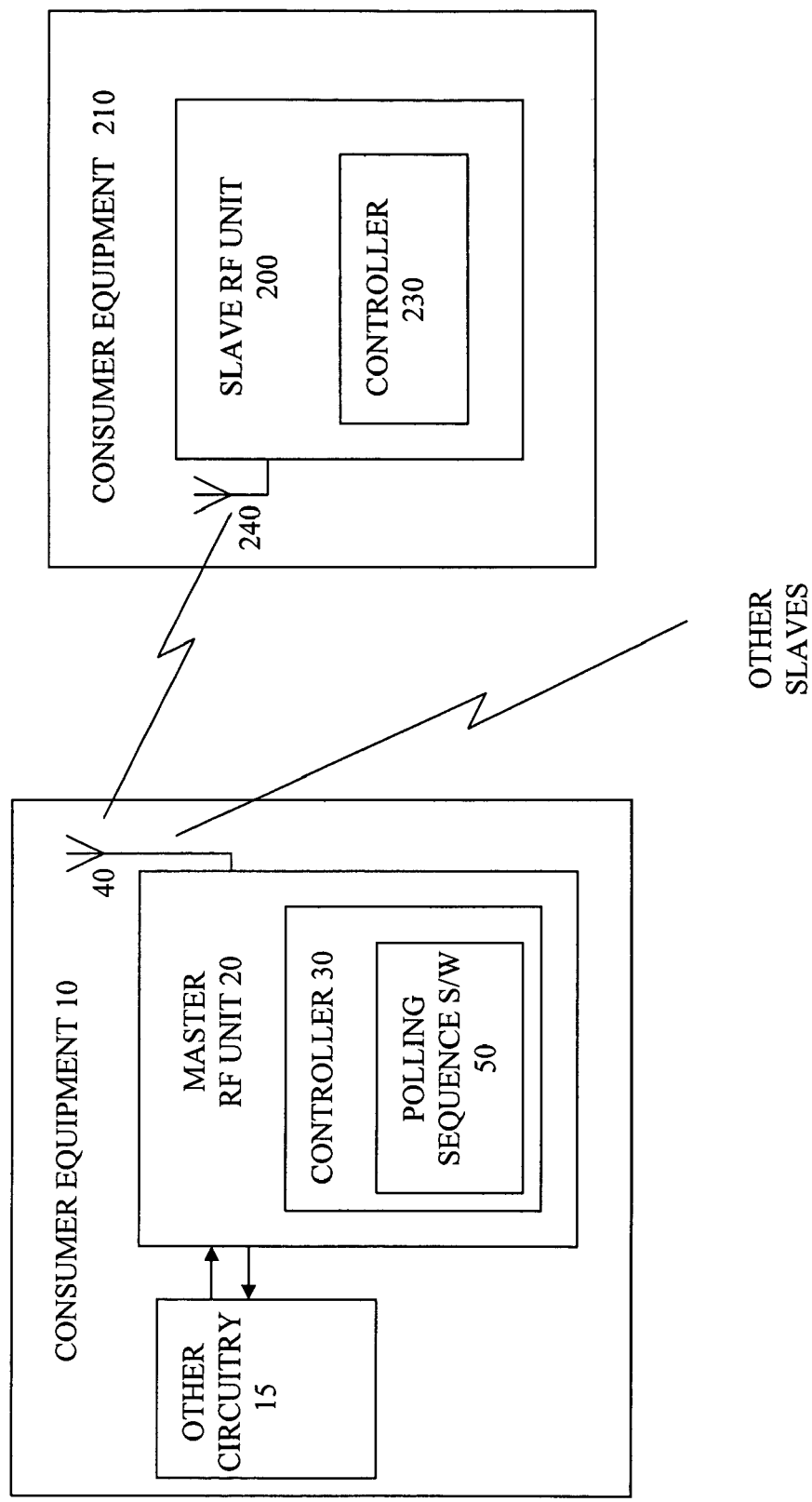
FIG. 1 is a schematic view of a Bluetooth master unit in consumer equipment as can be used with the present invention.

The present invention will now be described with reference to certain embodiments and with reference to the above mentioned drawings. Such description is by way of example only and the invention is not limited thereto. In particular the present invention will be described with reference to radio communications network but the present invention is not limited thereto. The term "wireless" should be interpreted widely to cover any communications system which does not use fix wireline communications for some of its transmissions. Alternative wireless communications systems include optical systems such as those operating with diffuse infra-red. It should also be noted that the term "wireless" also includes so-called cordless systems. General aspects of cordless communications systems are described for instance in the book by W. Tuttlebee, "Cordless Telecommunications Worldwide", Springer, 1997. Cordless systems are generally local, uncoordinated radio communications networks having a limited range.

It will be noted, however, that all the embodiments of the present invention can be used with the Bluetooth™ protocol. A network operated in accordance with the Bluetooth™ may be described as an uncoordinated cellular system. Embodiments of the present invention may be limited to one or more of the following features of such a system: slow frequency hopping as a spread spectrum technique; master and slave units whereby the master unit can set the hopping sequence; each device has its own clock and its own address; the hopping sequence of a master unit can be determined from its address; a set of slave units communicating with one master all have the same hopping frequency (of the master) and form a piconet; piconets can be linked through common slave units to form a scatternet; Time Division Multiplex Transmissions (TDMA) between slave and master units; Time Division Duplex (TDD) transmissions between slaves and masters units; transmissions between slave and master units may be either synchronous or asynchronous; master units determine when slave units can transmit; slave units may only reply when addressed by a master unit; the clocks in each telecommunications device are free-running; uncoordinated networks, especially those operating in the 2.4 GHz license-free ISM band; a software stack to enable applications to find other Bluetooth™ devices in the area; other devices are found by a discovery/inquiry procedure; and hard or soft handovers.

With regard to frequency hopping, "slow frequency hopping" refers to the hopping frequency being slower than the modulation rate, "fast frequency hopping" referring to a hopping rate faster than the modulation rate. The present invention is not necessarily limited to either slow or fast hopping.

In addition, in the following, reference will be made to "mobile terminals" however the present invention is not limited to all user terminals being mobile. Fixed terminals, e.g. a desk top computer, may be used equally well with the present invention. Reference will also be made to "packets" but the present invention is not limited to packet switched systems. The term "packet based" refers to any system which uses packets of information for transmission purposes whether the system is packet or circuit switched or any other type.

A first embodiment of the invention is shown in FIG. 1. A master RF unit 20 and a slave RF unit 200 are shown. As set out in the Bluetooth standard, the master is represented by the Bluetooth unit that initiates the connection (to one or more slave units). Note that the names 'master' and 'slave' only refer to the protocol on the channel: the Bluetooth units themselves are identical; that is, any unit can become a master of a piconet. Once a connection has been established, master-slave roles can be exchanged. The master radio frequency unit 20 has an antenna 40 for transmitting the Bluetooth radio signals over the air. In principle the RF signals can be transmitted over other media. The Bluetooth master unit is incorporated into consumer equipment 10. This can be mobile equipment such as a mobile phone, a smart phone, a cordless phone, a laptop or notebook computer or personal digital assistant for example, or other household equipment such as audio or video equipment, headsets, remote monitoring or sensing equipment and so on. Or it can be a PCMCIA card or a PCI card for a personal computer, a USB adapter or card, a modification for a PDA such as a cradle or plug-in to provide the Bluetooth capablity, a Bluetooth access point, e.g. for a local area network, or an adapter for other commercial or household equipment with a radio link, e.g. in automotive vehicles and applications. It may also be a module which provides radio services and which may be included with other semiconductor devices, e.g. on a PCB. Data for transmission over the Bluetooth link is passed to the master unit from other circuitry 15.

The master unit has a controller 30 for executing the polling sequence and other sequences. The controller is typically in the form of a microprocessor or other conventional hardware such as application specific circuitry or sequencers. The polling sequence may be in the form of software 50 which can be embedded in ROM or other memory, or be in removable or rewritable form. The software for implementing the polling sequence and other control sequences can be written in conventional computer readable code or languages, for execution by the controller. The slave RF unit 200 has a similar controller 230. Other parts of the units are not shown for the sake of clarity, and the reader is referred to the well known Bluetooth specification for more details.

Figure 2:
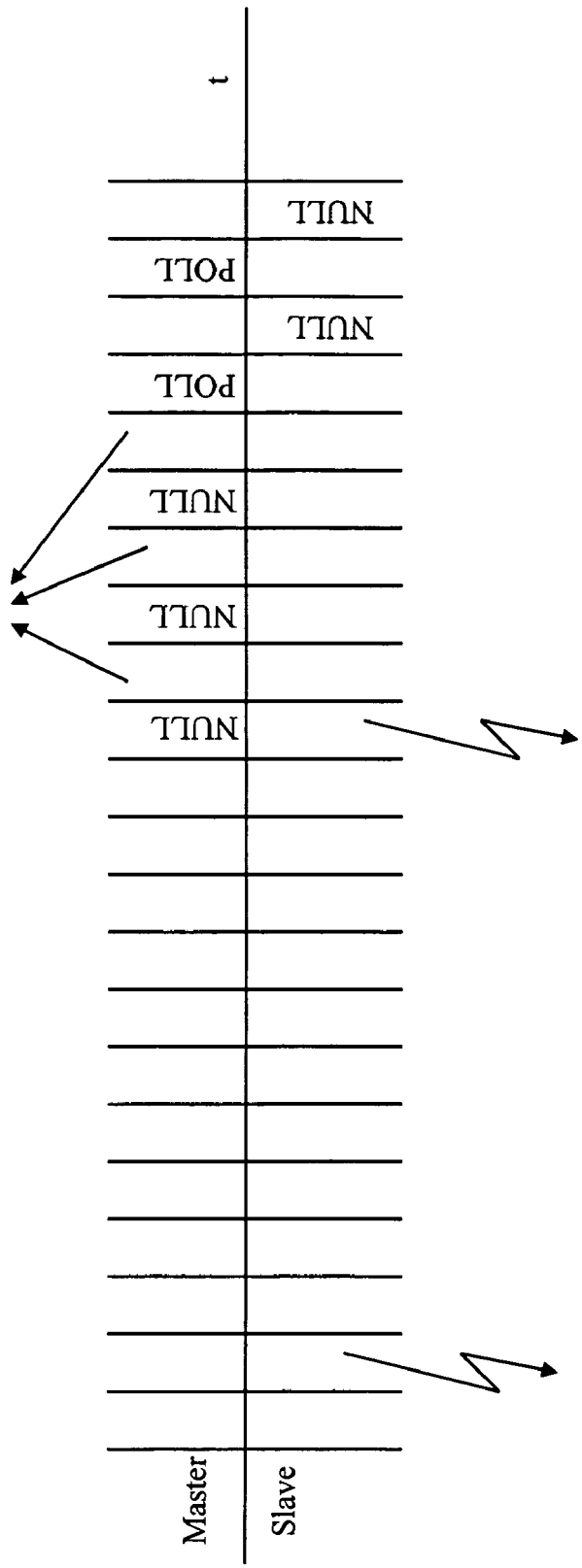
FIG. 2 is a time sequence of packets sent during the polling from a master to a slave according to an embodiment of the invention.
Figure 2:

FIG. 2 shows an example of a polling sequence for the link of FIG. 1. In this figure, the upper row shows a sequence of master time slots and the lower row shows slave slots. The master may need to schedule slots to serve many slaves, and many scheduling schemes have been proposed to provide fair and efficient sharing. The master's prescheduling algorithm allocates in advance a block of transmit and receive Tx/Rx packet pairs as shown. A Tx Null is followed immediately by an Rx slot, though the slave need not respond to the Null. After a number of these pairs, there is a Tx Poll followed by an Rx slot, and this is repeated. The slave must use the Rx slot to respond to the Poll packet. In the example shown, when the master uses the prescheduled block, there are 3 null packets transmitted before the first POLL packet. This is sufficient time and sufficient NULL packets for there to be a high likelihood of the slave being able to complete its resynchronization. Whether synchronization has been achieved may depend on many variables. The number of NULL packets or the duration of sending NULL packets can be determined according to the application. The number of NULL packets to be sent can be directly related to the number of sniff timeouts. Sniff parameters such as sniff interval, sniff attempts and sniff timeout are under the control of the application running on top of the Bluetooth system. Generally, an application should take into account: the maximum allowed latency which will determine the sniff interval; the throughput/bandwidth needed while in the sniff mode: this determines the number of attempts after the sniff interval is known, when taking into account peak bandwidth and average bandwidth, the sniff attempts and sniff timeouts can be determined; increasing the number of sniff attempts for longer sniff intervals especially when there are bad radio conditions.

The number of NULL and POLL packets should be the same number of POLL packets which would have been used before replacement of some of the POLL packets with NULL packets. The number of NULL packets should be greater than or equal to the number of sniff attempts. The number of attempts is preferably thereby respected and timeout slots allowed for.

The NULL packets and any type of packets contain the channel access code from which timing information can be derived to enable synchronization, as is well known. Since the slave has not needed to respond to the NULL packets, it has been able to save the energy used in transmission, which is of course much greater than is used for reception or internal processing. This means battery life can be extended, which is critical for many applications.

Clearly the advantages are applicable beyond Bluetooth to other similar RF protocols. They can apply wherever there is polling to maintain synchronization or to maintain awareness of other devices within range. This sort of synchronization is needed for any type of frequency hopping system, if a connection is to be maintained with minimum power consumption. The synchronization state of slaves can be recorded in ways other than a link supervision timer. Although shown for a case with prescheduling, it is applicable to masters which are not using this or use it selectively.

The present invention also includes executable software which can be executed on a controller of a master wireless unit to control communications with a slave wireless unit by sending packets. The software may contain code which when executed is arranged to address the slave to enable the slave to resynchronize to the master. The software code may be arranged to initiate sending of a first number of packets which need no response, to enable the slave to resynchronize, followed by a packet which prompts a response, to determine whether the slave has resynchronized. The software may also include code, which when executed causes the packets to be sent using a frequency hop scheme. The software code may be arranged to implement the Bluetooth standard for communicating with the slave unit, e.g. when the slave unit is in a mode in which it periodically listens to transmissions from the master unit. The software may include code, which when executed is arranged to use prescheduled slots for transmit and receive packet pairs, allocated in advance for the polling. The software code when executed may include a link supervision timer which it can update according to packets received from the remote device. The software is preferably written in a high level language and then compiled on a compiler which is adapted for a microprocessor used within the controller of the master unit. Alternatively, the software may be written for implementation on a programmable digital logic device, such as a Programmable Gate Array, especially a Field Programmable Gate Array (FPGA).

As described above, a Bluetooth master radio frequency unit addresses a slave radio frequency unit, to enable the slave to resynchronize to the master, by sending packets which prompt a response from the slave, for example null packets, the master being arranged to send sufficient, e.g. a first number of null packets to enable the slave to resynchronize, before sending a packet which requires a response form the slave, e.g. a poll packet, to determine whether the slave has resynchronized. This approach can provide the slave with the same number of synchronization packets as in the simpler algorithms, while allowing the slave to preserve more (transmit) power and still allowing the master to detect whether the slave has resynchronized or not (and thus to update a Link Supervision Timer for example). Notably this is also suitable for use in prescheduling implementations. Other variations can be envisaged by those skilled in the art which are intended to be within the scope of the claims.

What is claimed is:

1. A master wireless unit arranged to communicate with a slave wireless unit by sending packets, the master wireless unit having a controller arranged to send a sequence of packets addressed to the slave wireless unit in regularly spaced sniff slots of a Bluetooth sniff mode, the sniff slots being at longer intervals than during normal operation, the packets enabling the slave wireless unit to resynchronize to the master wireless unit, the sequence of packets including a first number of packets which need no response by the slave wireless unit, to enable the slave wireless unit to resynchronize, followed by a packet which prompts a response by the slave wireless unit, to determine whether the slave wireless unit has resynchronized.

2. The master wireless unit of claim 1, wherein the slave wireless unit is in a mode in which it does not maintain synchronization but wakes periodically to resynchronize and the controller is arranged to send the packet which prompts a response while the slave wireless unit is still listening.

3. The master wireless unit according to claim 1, wherein the master wireless unit is adapted to address an individual slave wireless unit when sending the first number of packets which need no response.

4. The master wireless unit according to claim 1, wherein the master wireless unit is adapted to send data to a slave wireless unit in between sending packets of the first number of packets.

5. The master wireless unit of claim 1, wherein the packets are sent using a frequency hop scheme.

6. The master wireless unit of claim 1, arranged to use the Bluetooth standard for communicating with the slave wireless unit.

7. The master wireless unit of claim 1, wherein the slave wireless unit is in a mode in which it periodically listens to transmissions.

8. The master wireless unit of claim 1, arranged to use prescheduled slots for transmit and receive packet pairs, allocated in advance for determining whether the slave wireless unit has resynchronized.

9. The master wireless unit of claim 1, having a link supervision timer which it can update according to the response.

10. The master wireless unit of claim 1, wherein the packets which need no response are Bluetooth NULL packets.

11. The master wireless unit of claim 1, wherein the packets which prompt a response are Bluetooth POLL packets.

12. Consumer equipment having the master wireless unit of claim 1.

13. A computer readable medium encoded with software for implementing a controller of a master wireless unit, comprising code segments for addressing a slave wireless unit to enable the slave wireless unit to resynchronize to the master wireless unit by sending a sequence of packets addressed to the slave wireless unit in regularly spaced sniff slots of a Bluetooth sniff mode, the sniff slots being at longer intervals than during normal operation, the sending of the sequence of packets including sending a first number of packets which need no response by the slave wireless unit, the slave wireless unit to resynchronize, followed by sending a packet which prompts a response by the slave wireless unit, to determine whether the slave wireless unit has resynchronized.

14. The computer readable medium of claim 13, wherein the slave wireless unit is in a mode in which it does not maintain synchronization but wakes periodically to resynchronize and the software comprises code segments for sending the packet which prompts a response while the slave wireless unit is still listening.

15. A method of using a master wireless unit to communicate with a slave wireless unit by sending packets, and to address the slave wireless unit to enable the slave wireless unit to resynchronize to the master wireless unit, the method comprising: sending a sequence of packets addressed to the slave wireless unit in regularly spaced sniff slots of a Bluetooth sniff mode, the sniff slots being at longer intervals than during normal operation, the sending of the sequence of packets including sending a number of packets which need no response by the slave wireless unit, to enable the slave wireless unit to resynchronize, followed by sending a packet which prompts a response by the slave wireless unit, to determine whether the slave wireless unit has resynchronized.

16. The method of claim 15, wherein the slave wireless unit is in a mode in which it does not maintain synchronization but wakes periodically to resynchronize, and the sending of the packet, to determine whether the slave wireless unit has resynchronized which prompts a response is done while the slave wireless unit is still listening.

* * * * *

UNITED STATES PATENT AND TRADEMARK OFFICE
CERTIFICATE OF CORRECTION

PATENT NO. : 7,564,832 B2
APPLICATION NO. : 10/996121
DATED : July 21, 2009
INVENTOR(S) : Jorgen Van Parys It is certified that error appears in the above-identified patent and that said Letters Patent is hereby corrected as shown below:

Col. 6, line 4, should read:
--the Bluetooth capability, a Bluetooth access point, e.g. for a--

Col. 7, line 60, should read:
--sending a packet which requires a response from the slave,--

Col. 8, line 62, should read:
--need no response by the slave wireless unit, to enable the slave wireless--

Signed and Sealed this

First Day of September, 2009

David J. Kappos
*Director of the United States Patent and Trademark Office*